United States Patent
Mules

[11] Patent Number: 5,885,392
[45] Date of Patent: Mar. 23, 1999

[54] METHOD OF BONDING END CAPS TO PLEATED FILTER ELEMENTS

[75] Inventor: Robert S. Mules, Talbot, United Kingdom

[73] Assignee: AlliedSignal Inc., Morristown, N.J.

[21] Appl. No.: 869,163

[22] Filed: Jun. 4, 1997

[30] Foreign Application Priority Data

Jun. 10, 1996 [GB] United Kingdom ............... 9612103

[51] Int. Cl.$^6$ .......................... B31F 53/04; B01D 27/06
[52] U.S. Cl. ........................ 156/204; 156/295; 156/227
[58] Field of Search .................... 55/498; 210/493.1, 210/493.5, 497.01; 156/204, 227, 474, 295, 187, 205; 428/181, 182, 186

[56] References Cited

U.S. PATENT DOCUMENTS 2,663,660 12/1953 Layte ............................. 55/498 X
3,042,571 7/1962 Jackson ......................... 156/227 X
5,071,555 12/1991 Enbom ............................ 210/493.5

*Primary Examiner*—Richard Crispino
*Assistant Examiner*—Shawn A. Mitchell

[57] ABSTRACT

A filter element, e.g. for an oil filter, which may be annular, is formed from an elongate sheet of paper or paper-like material having elongate side edges, and strips of hot-melt adhesive are applied to extend with one strip of adhesive 10 immediately adjacent one longitudinal side edge and another strip of adhesive similarly immediately adjacent the other elongate side edge of the sheet. The sheet is then folded in concertina fashion, to form an assembly of a plurality of stacked panels 14, which are hinged at folds alternatively on one side and the other of the concertina assembly, whereafter the panels are pressed together whereby alternate pairs of adjacent panels are secured together, and whereby adhesive is squeezed beyond the ends of the secured panels to form beads 16 of adhesive. A sealing element 22 is pressed against each bead of adhesive, one at one end and one at the other end of the assembly, and heat is applied to reactivate the hot-melt adhesive and thereby secure the sealing element 22 to the assembly.

5 Claims, 2 Drawing Sheets

METHOD OF BONDING END CAPS TO PLEATED FILTER ELEMENTS

The present invention relates to a filter element and a method of its manufacture. While the filter element of the present invention may be used and are primarily intended for use as oil filters, they can also be used in other filtering situations, such as in air filters.

It is known to form a filter element from an elongate sheet of paper or paper-like material having elongate side edges, strips of hot-melt adhesive being applied to the elongate sheet usually several millimeters from the edge. The sheet is then folded in concertina fashion to form an assembly of a plurality of stacked panels which are hinged at the folds alternatively on one side and the other of the concertina assembly, and the panels are pressed together whereby alternate pairs of adjacent panels are secured together.

Such an assembly is customarily then formed into an annulus and the end panels of the assembly are secured to one another. After these steps have been taken, sealing of the ends is usually effected by securing end caps by adhesive to the two ends of the annular filter thus formed.

While such an arrangement has proved very satisfactory, it is an object of the present invention to provide a method which is even more economical.

Thus, according to the present invention, there is provided a method of forming a filter element comprising the steps of:

a) providing an elongate sheet of paper or paper-like material, having elongate side edges;

b) applying strips of hot-melt adhesive to extend with one strip of adhesive immediately adjacent one elongate side edge and another strip of adhesive immediately adjacent the other elongate side edge of the sheet;

c) folding the elongate sheet of paper or paper-like material in concertina fashion, to form an assembly of a plurality of stacked panels which are hinged at the folds alternately on one side and the other of the concertina assembly;

d) pressing the panels together whereby alternate pairs of adjacent panels are secured together and whereby adhesive is squeezed beyond the ends of the secured panels to form beads of adhesive;

e) providing two sealing elements;

f) pressing each sealing element against the associated bead of adhesive to secure the sealing elements to the edges of said assembly; and g) applying heat to activate the hot-melt adhesive.

According to the invention, because the strips of adhesive are applied immediately adjacent the elongate side edges of the sheet, when the sheet is folded in concertina fashion, some of the hot-melt adhesive is squeezed out and projects beyond the ends. The assembly will rapidly cool thereby holding the panels in this configuration. Later, according to the invention, a sealing element is provided at each end and is pressed against the bead of hot-melt adhesive which has been squeezed out between adjacent panels. By applying heat, the adhesive is activated and the sealing element can readily be secured.

It is contemplated that the filter element of the invention could be used in the generally flat arrangement with air flowing from one side to the other. However, as is conventional, preferably, prior to pressing the sealing elements against the bead of adhesive, the additional steps are carried out forming the assembly into an annulus, and securing the end panels of the assembly to one another, thereby to form an annular filter element.

The two sealing elements will then be chosen to be of an annular construction rather in the form of the conventional washers. Preferably the sealing elements are dimensioned whereby the internal circumference of the sealing elements overlie the internal circumference of the assembly.

Where the assembly has been formed into an annulus, the heat which is applied to activate the adhesive is preferably applied by blowing hot air from a perforated annular nozzle adjacent each sealing element.

The hot-melt adhesive which is applied prior to folding, is preferably itself provided in a hot state in two continuous strips, one immediately adjacent each edge of the sheet material.

According to another aspect of the present invention, there is provided a filter element comprising an elongate sheet of paper or paper-like material folded into a concertina assembly of a plurality of stacked panels, alternate pairs of stacked panels being secured together by a hot-melt adhesive strip immediately adjacent the end edges of the panels, and sealing elements secured to the end edges by some of said hot-melt adhesive squeezed from between adjacent panels.

The filter element of the present invention can be used in any standard form of filter. If the filter element is of an annular form, preferably, according to yet another aspect of the invention, there is provided a filter comprising a base, an internally threaded bore, a filter element according to invention mounted within said casing and surrounding said perforated hollow support core and means associated with said base and with the end of said core adjacent said end wall, for sealingly engaging said sealing elements.

In order that the present invention may more readily be understood, the following description is given, merely by way of example, reference being made to the accompanying drawings in which.

Figure 1:
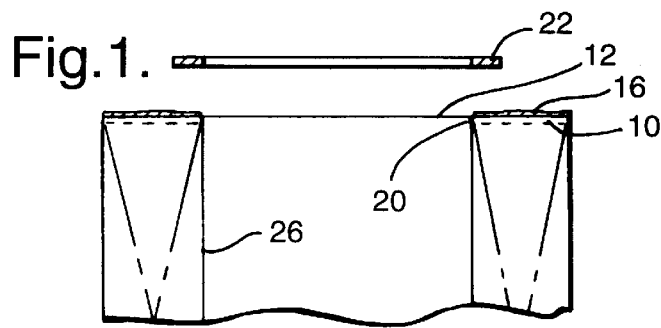
FIG. 1 is a schematic cross-section of one way of carrying out the present invention on an annular seal, illustrating the sealing element prior to assembly on a filter element assembly.

Referring first to FIGS. 1 to 4, in a step of the invention prior to that illustrated in the drawing, an elongate sheet of paper or paper-like material has applied immediately adjacent each longitudinal side edge of the sheet a continuous strip of hot-melt adhesive. After this hot-melt adhesive has been applied, the elongate sheet is folded, in a conventional manner, in concertina fashion, to form of an assembly of a plurality of stacked panels which are hinged at the folds alternatively on one side and then the other. To form an annular filter, as shown partly in FIG. 3, the end panels of the assembly are adhered, again in a conventional manner, thereby to form an annular filter element.

Figure 1A:
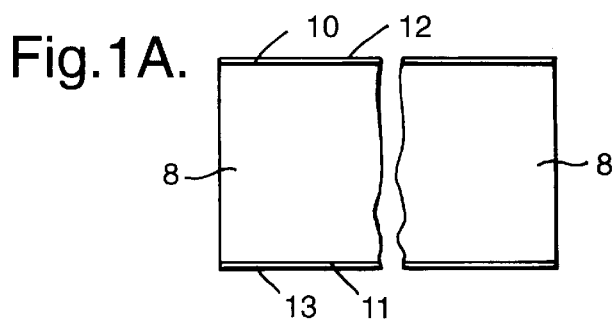
FIG. 1A shows, to a much reduced scale, the application of the adhesive to the paper strip, according to the method of the invention.
Figure 2:
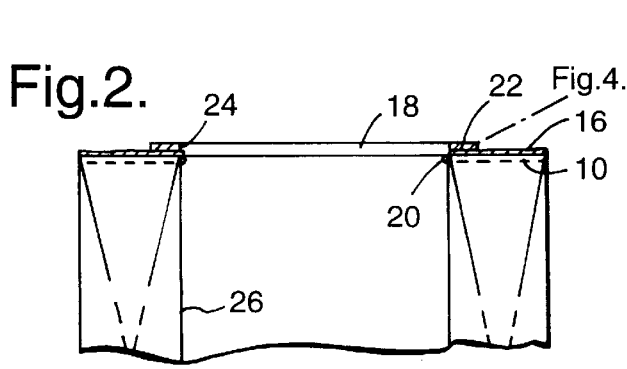
FIG. 2 is a similar view showing the sealing element in place.
Figure 4:
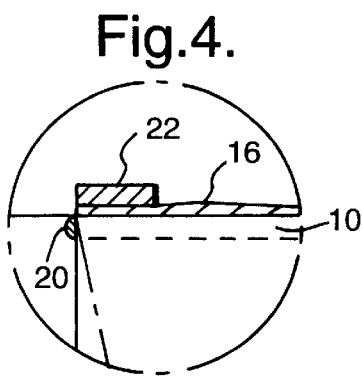
FIG. 4 is an enlarged view of a portion of the structure shown in FIG. 2.
Figure 3:
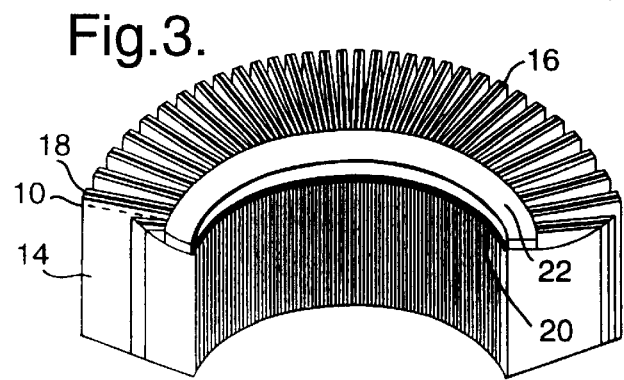
FIG. 3 is a schematic perspective view of a portion of the completed sealing element.

In the conventional method of carrying out this step, the strip of adhesive is usually applied a few millimeters from the edge. According to the present invention, the strips of adhesive 10,11 are applied immediately adjacent the side edges 12,13 of the sheet of paper 8 which, as such, is illustrated in FIG. 1A, but when the sheet is folded in concertina fashion, forms the panels 14. As can be seen from the drawings, as this folding step is carried out, a bead 16 of hot-melt adhesive is squeezed outwardly beyond the ends 18 of each panel. Furthermore, an auxiliary bead 20 is squeezed adjacent each end into the hollow centre of the filter element immediately adjacent the ends thereof.

The hot-melt adhesive is applied in a hot state and when the sheet material is folded in concertina fashion, it adheres alternate panels to one another, the other alternate panels leaving gaps therebetween in a conventional manner whereby, in use, the fluid to be filtered can pass between these other adjacent panels, and thence through the paper-like filter material to be discharged into the interior of the annular filter. Any suitable form of hot-melt adhesive may be used, e.g. a polyester or polyurethane having a melt temperature, for example of 230° to 250° C.

According to the present invention, a sealing element, in this instance an annular sealing element 22, is applied to each end of the filter assembly and is pressed against the bead of adhesive 16. The internal circumference 24 of the sealing elements 22 is dimensioned to overlie the internal circumference 26 of the assembly. As mentioned, the sealing element 22 is pressed against the hot-melt adhesive which is then activated by being heated, e.g. by blowing from an annular perforated nozzle which is positioned closely adjacent each sealing element 22, one at each end of the filter element.

It will be appreciated that with this method according to the present invention, the same adhesive is used to adhere the adjacent panels to one another, and to adhere the sealing element in place. This greatly reduces the handling costs and thus the overall expense of the filter element.

Figure 5:
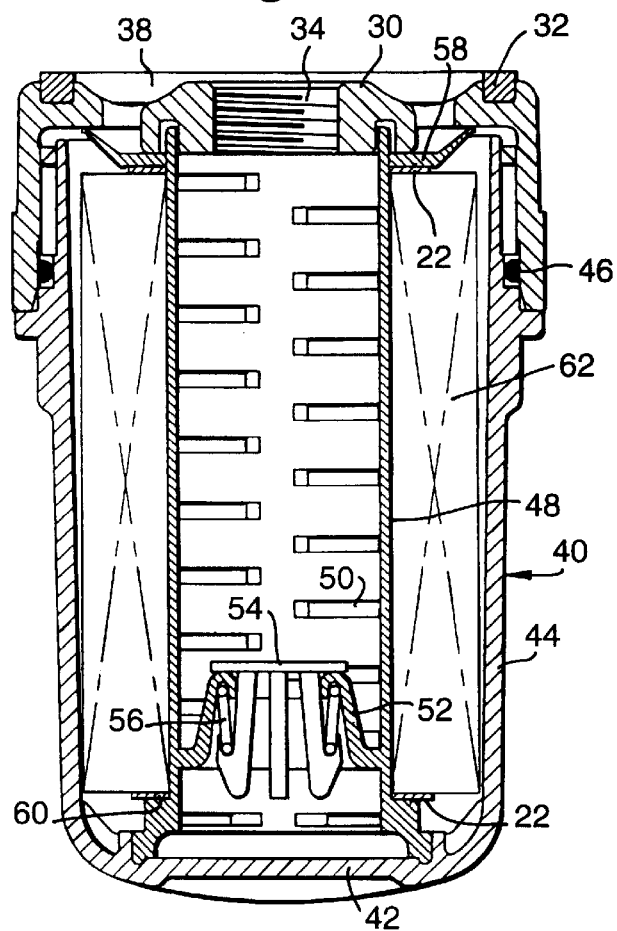
FIG. 5 is a half-section through a filter including a filter element as shown in FIG. 3.
Figure 6:
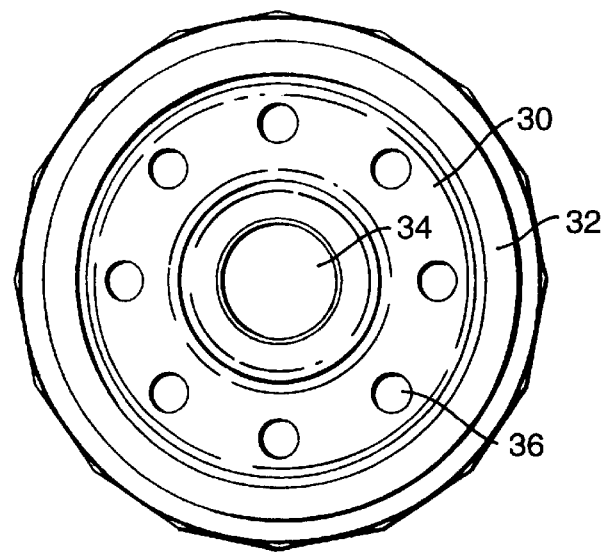
FIG. 6 is a plan view of the element of FIG. 5.

The filter element illustrated in FIGS. 1 to 4 may be employed in a filter as shown in FIG. 5. This filter includes an annular base 30 which may be formed of aluminium, another metal, or preferably of a plastics material and is provided with a groove to support a sealing gasket 32. At its centre the base is provided with an internally threaded bore 34 and, in this instance, with eight inlet openings 36 which are connected to an inlet chamber 38 formed at the free end of the base 30.

A casing 40 formed as a plastics material moulding includes an end wall 42, and an upstanding annular side wall 44, conventional means (not shown) being provided at the end of the upstanding side wall spaced from the end wall 42, for securing releasibly the casing to the base. This may include a screw thread, bayonet fitting, or the like. An O-ring seal 46 is provided to seal between the casing and the base.

Welded to the end wall, e.g. by ultrasonic welding, is a perforated hollow support core in the form of a plastics material inner wall 48. The perforations, in the form of circumferential slits 50 are illustrated in FIG. 5. Integrally formed with the inner wall 48 is the body 52 of a conventional overpressure valve which include a valve member 54, and a valve spring 56.

Adjacent its upper end the filter includes a conventional annular non-return flap valve 58. It will be noted that the inner wall includes, spaced from its lower end, an annular shoulder 60.

Having removed the casing 40 from the base 30, a filter element as shown in FIGS. 1 to 4, indicated by the general reference numeral 62, is inserted into the casing and the lower sealing element 22 abuts against the annular shoulder 60. The non-return flap valve 58 is then positioned to abut the upper sealing element 22 and the casing is secured, in a conventional way, to the base.

It has been found that the mounting of the inner wall 48 on the end wall 42 of the casing 40 by ultrasonic or friction welding is an extremely economical way to manufacture such a casing and still provides adequate support for the valve element. A further feature of this overall assembly is that the additional annular bead 20 of the hot-melt adhesive which has been squeezed into the interior of the filter element, at each end, provides a further seal, at the ends, between the filter element and the inner wall 48 of the casing.

I claim:

1. A method of forming a filter element comprising the steps of:

a) providing an elongate sheet of paper or paper-like material, having elongate side edges;

b) applying strips of hot-melt adhesive to extend with one strip of adhesive immediately adjacent one elongate side edge and another strip of adhesive immediately adjacent the other elongate side edge of the sheet;

c) folding the elongate sheet of paper or paper-like material in concertina fashion, to form an assembly of a plurality of stacked panels which are hinged at the folds alternately on one side and the other of the concertina assembly;

d) pressing the panels together whereby alternate pairs of adjacent panels are secured together and whereby adhesive is squeezed beyond the ends of the secured panels to form beads of adhesive;

e) providing two sealing elements;

f) pressing each sealing element against the associated bead of adhesive to secure the sealing elements to the edges of said assembly; and g) applying heat to activate the hot-melt adhesive.

2. A method as claimed in claim 1, and further comprising, prior to pressing the sealing elements against the bead of adhesive, the additional steps of forming the assembly into an annulus, and securing the end panels of the assembly to one another thereby to form an annular filter element and wherein the two sealing elements are annular sealing elements.

3. A method as claimed in claim 2, wherein the two sealing elements are dimensioned whereby the internal circumferences of the sealing elements coincide with the internal circumference of the assembly.

4. A method as claimed in claim 2, wherein the heat which is applied to activate the adhesive is applied by blowing hot air from a perforated annular nozzle.

5. A method as claimed in claim 1, wherein the strips of adhesive are each continuous strips.

* * * * *